(12) United States Patent
Boruff et al.

(10) Patent No.: US 9,788,482 B2
(45) Date of Patent: Oct. 17, 2017

(54) GRASS MOWING MACHINE WITH HYDRAULIC CIRCUIT HAVING DIVERTER VALVE

(71) Applicant: Deere & Company, Moline, IL (US)

(72) Inventors: Paul A. Boruff, Raleigh, NC (US); Brent G. Rinholm, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 33 days.

(21) Appl. No.: 14/989,324

(22) Filed: Jan. 6, 2016

(65) Prior Publication Data

US 2017/0188509 A1 Jul. 6, 2017

(51) Int. Cl.
*A01D 34/00* (2006.01)
*A01D 69/03* (2006.01)
*A01D 101/00* (2006.01)

(52) U.S. Cl.
CPC ........... *A01D 34/008* (2013.01); *A01D 69/03* (2013.01); *A01D 2101/00* (2013.01)

(58) Field of Classification Search
CPC ...... A01D 34/475; A01D 34/60; A01D 75/30; A01D 34/008; A01D 69/03; A01D 2101/00; B62D 5/07; B65F 3/06; E02F 9/2232; E02F 9/2292; E02F 9/2239; E02F 9/2296; F15B 11/162; F15B 11/16; F15B 2211/3116; F15B 2211/45; F15B 2211/455; F15B 2211/4053; F15B 2211/40507; F16H 61/42; F16H 61/461; F16H 61/452; F16H 61/44
USPC ....... 56/6, 7, 10.9, 11.3, 233, 10.2 A–10.2 F, 56/10.2 R; 137/596; 60/422, 424, 423, 60/427; 91/513, 516, 520; 180/308; 414/408, 810

See application file for complete search history.

(56) References Cited

U.S. PATENT DOCUMENTS

| | | | | |
|---|---|---|---|---|
| 3,854,271 A | * | 12/1974 | Aldred | A01D 34/475 56/10.9 |
| 4,384,443 A | | 5/1983 | Hoogttrate | |
| 4,573,319 A | * | 3/1986 | Chichester | B62D 5/07 60/422 |
| 4,977,928 A | * | 12/1990 | Smith | E02F 9/2232 137/596 |
| 6,240,949 B1 | | 6/2001 | Gerstenberger | |
| 6,609,356 B2 | * | 8/2003 | Fackrell | A01D 75/30 56/233 |
| 6,662,895 B1 | * | 12/2003 | Bednar | F16H 61/42 180/308 |
| 7,047,735 B2 | * | 5/2006 | Sprinkle | E02F 9/2292 60/421 |
| 7,927,060 B2 | | 4/2011 | Biggerstaff et al. | |

FOREIGN PATENT DOCUMENTS

| | | |
|---|---|---|
| GB | 1525388 A | 9/1978 |
| GB | 2542673 A | 3/2017 |

OTHER PUBLICATIONS

Search Report in counterpart application GB1620289.7, dated May 26, 2017 (4 pages).

\* cited by examiner

*Primary Examiner* — Robert Pezzuto

(57) ABSTRACT

A grass mowing machine has a plurality of cutting units, and a diverter valve diverting hydraulic flow from a raise/lower sub-circuit to a mowing sub-circuit when the engine runs at a reduced or economy mode speed and the cutting units are at the lowered position.

11 Claims, 6 Drawing Sheets

GRASS MOWING MACHINE WITH HYDRAULIC CIRCUIT HAVING DIVERTER VALVE

FIELD OF THE INVENTION

This invention relates to grass mowing machines, and specifically to a grass mowing machine with a hydraulic circuit for multiple cutting units that may be raised and lowered.

BACKGROUND OF THE INVENTION

Grass mowing machines such as greens mowers or fairway mowers on golf courses may have a hydraulic circuit with hydraulic pumps driven by an internal combustion engine. The hydraulic circuit may include sub-circuits such as a mowing sub-circuit to rotate motors on several cutting units and a raise/lower sub-circuit to move the cutting units between a raised position and a lowered position.

It is desirable to operate grass mowing machines at slower engine speeds to reduce vehicle noise and fuel consumption. However, it also is desirable to maintain rotational speed for the cutting units. Otherwise slow blade rotation would reduce cutting unit performance. A grass mowing machine with a hydraulic circuit is needed that maintains rotational speed for multiple cutting units at reduced engine speeds.

SUMMARY OF THE INVENTION

A grass mowing machine with a plurality of cutting units and a hydraulic circuit having a diverter valve. The hydraulic circuit includes a raise/lower sub-circuit connected to an operator actuated raise/lower lever to move the cutting units between a raised position and a lowered position, and a mowing sub-circuit for rotating a motor on each of the cutting units. An electronic vehicle control unit actuates the diverter valve diverting hydraulic flow from the raise/lower sub-circuit to the mowing sub-circuit while the internal combustion engine runs at a reduced or economy mode speed and the cutting units are in the lowered position.

DETAILED DESCRIPTION OF A PREFERRED EMBODIMENT

Figure 1:
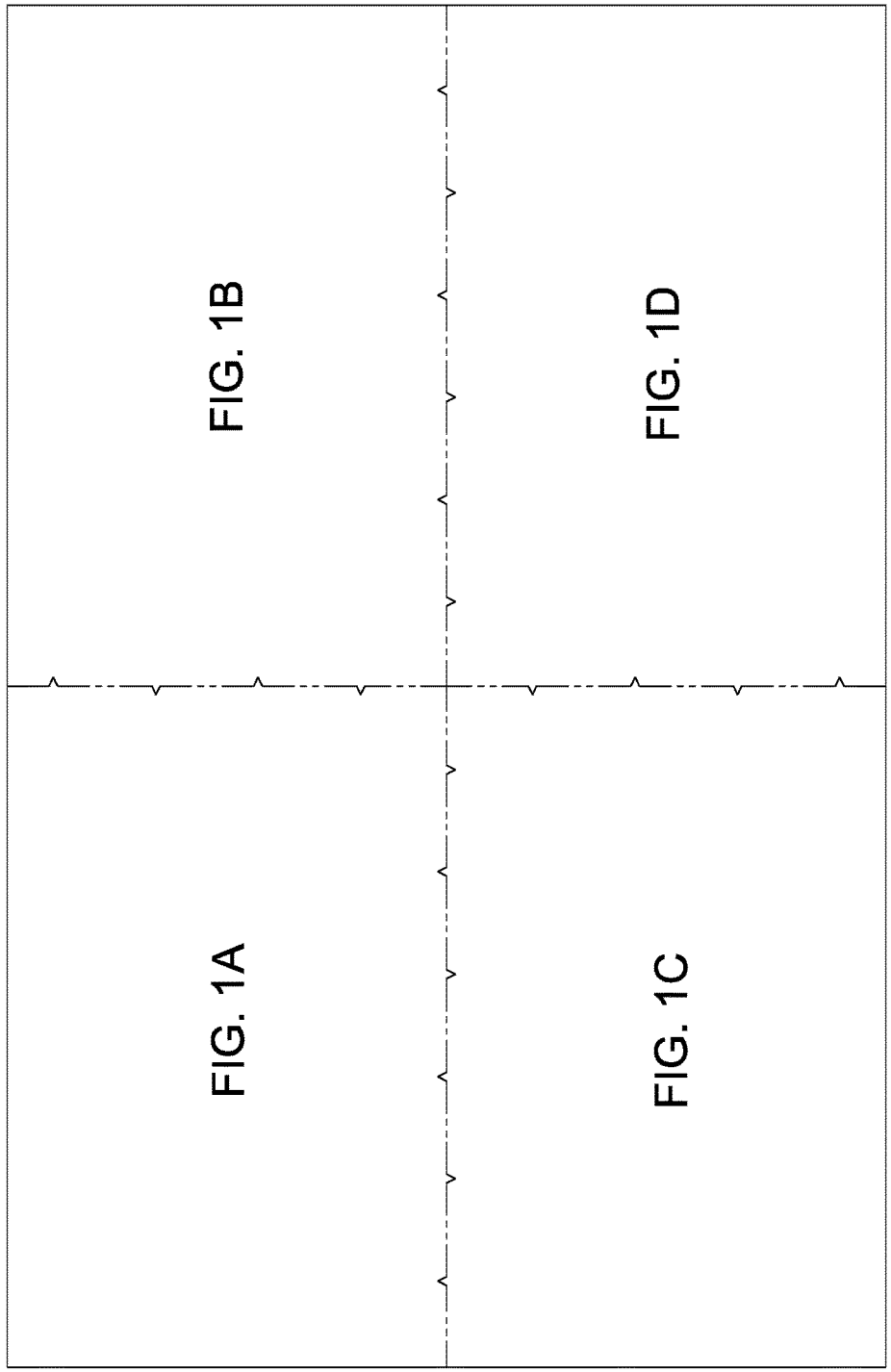
FIG. 1 comprises FIGS. 1A, 1B, 1C and 1D.
Figure 1A:
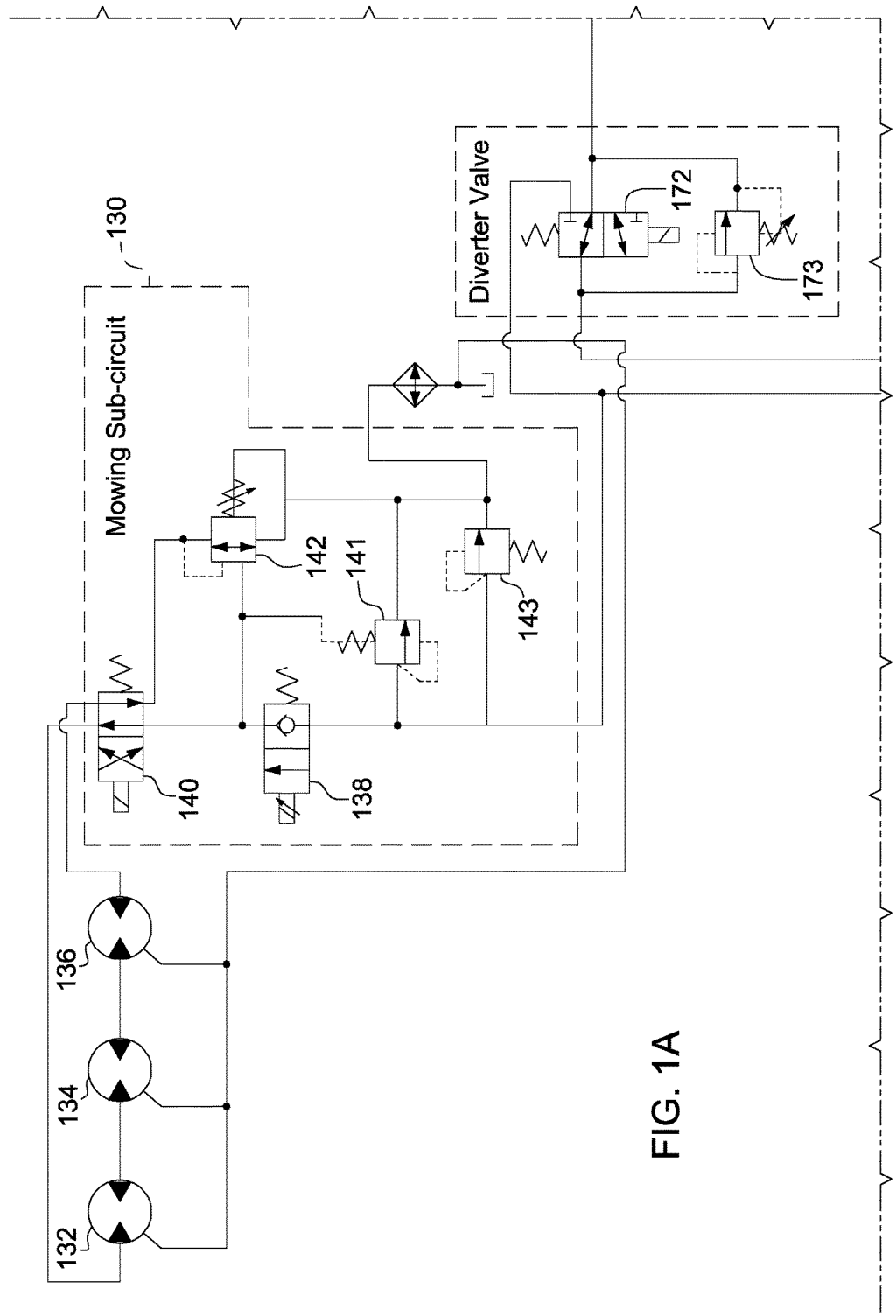
FIG. 1A is a first part of a schematic drawing of a hydraulic circuit having a diverter valve according to a first embodiment of the invention.
Figure 1B:
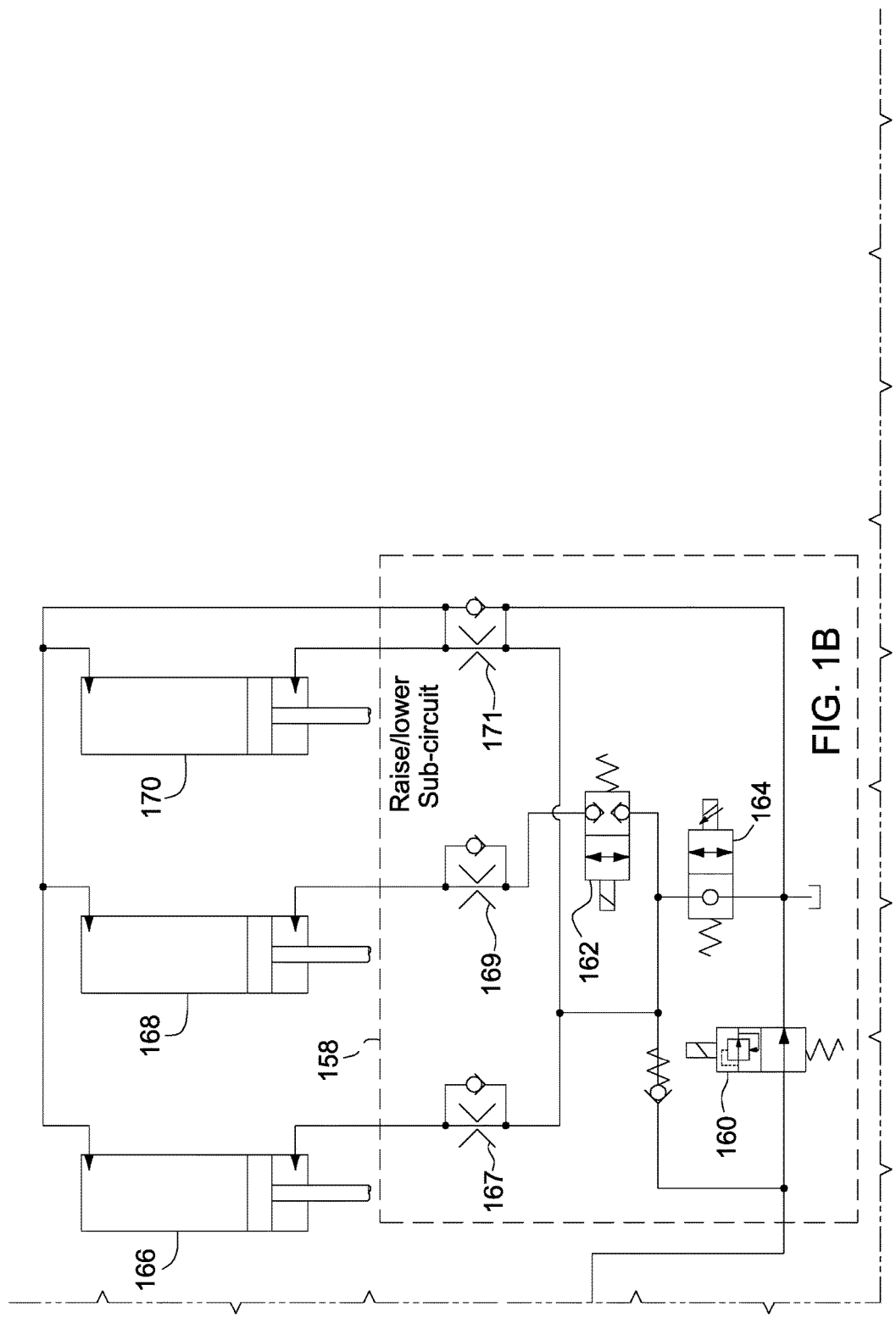
FIG. 1B is a second part of a schematic drawing of a hydraulic circuit having a diverter valve according to a first embodiment of the invention.

FIG. 1 comprises FIGS. 1A, 1B, 1C and 1D, each of which are part of a schematic drawing for a hydraulic circuit having a diverter valve on a grass mowing machine such as a greens mower or fairway mower. FIG. 2 is a system diagram of a grass mowing machine with a hydraulic circuit having a diverter valve. The hydraulic circuit with a diverter valve may be used and is intended for use on grass mowing machines having a plurality of cutting units, and an internal combustion engine. The engine may run at normal speeds or at reduced or economy mode speeds. For example, an engine may have a normal speed of about 3200 rpm and a reduced or economy mode speed of about 2250 rpm. The operator of the grass mowing machine may select the normal speed or economy mode speed. However, the hydraulic circuit with a diverter valve also may be used on grass mowing machines having only a single engine speed or multiple engine speeds.

In one embodiment, the hydraulic circuit with a diverter valve may be used to maintain rotational speed of a plurality of several reel or rotary cutting units while the internal combustion engine runs at a reduced or economy mode speed. Additionally, the circuit may be used to maintain or increase speed of several cutting units during operation at normal engine speeds and/or increased traction drive speeds, or during operation of a hydraulically driven attachment such as a verticutter. The hydraulic circuit with a diverter valve may be used with grass mowing machines having several different configurations.

In one embodiment, as shown in FIG. 2, the hydraulic circuit with a diverter valve may be included on a grass mowing machine having electronic vehicle control unit 178 including a microprocessor and memory. The electronic vehicle control unit, or VCU, may be signal connected to display 180 and to one or more other operator input devices located in the operator station of the grass mowing machine. The electronic vehicle control unit also may be signal connected to one or more sensors that may provide data input concerning operation of the grass mowing machine. Additionally, the electronic vehicle control unit may be signal connected to solenoids that operate valves in the hydraulic circuit.

In one embodiment, the grass mowing machine may have an economy mode switch 174 or other similar operator input device that an operator may use to reduce engine speed to the economy mode speed. The economy mode switch may be connected to electronic vehicle control unit 178 which may command engine speed. The grass mowing machine also may have engine speed sensor 204 which may detect and provide actual engine speed data to the vehicle control unit.

Figure 1C:
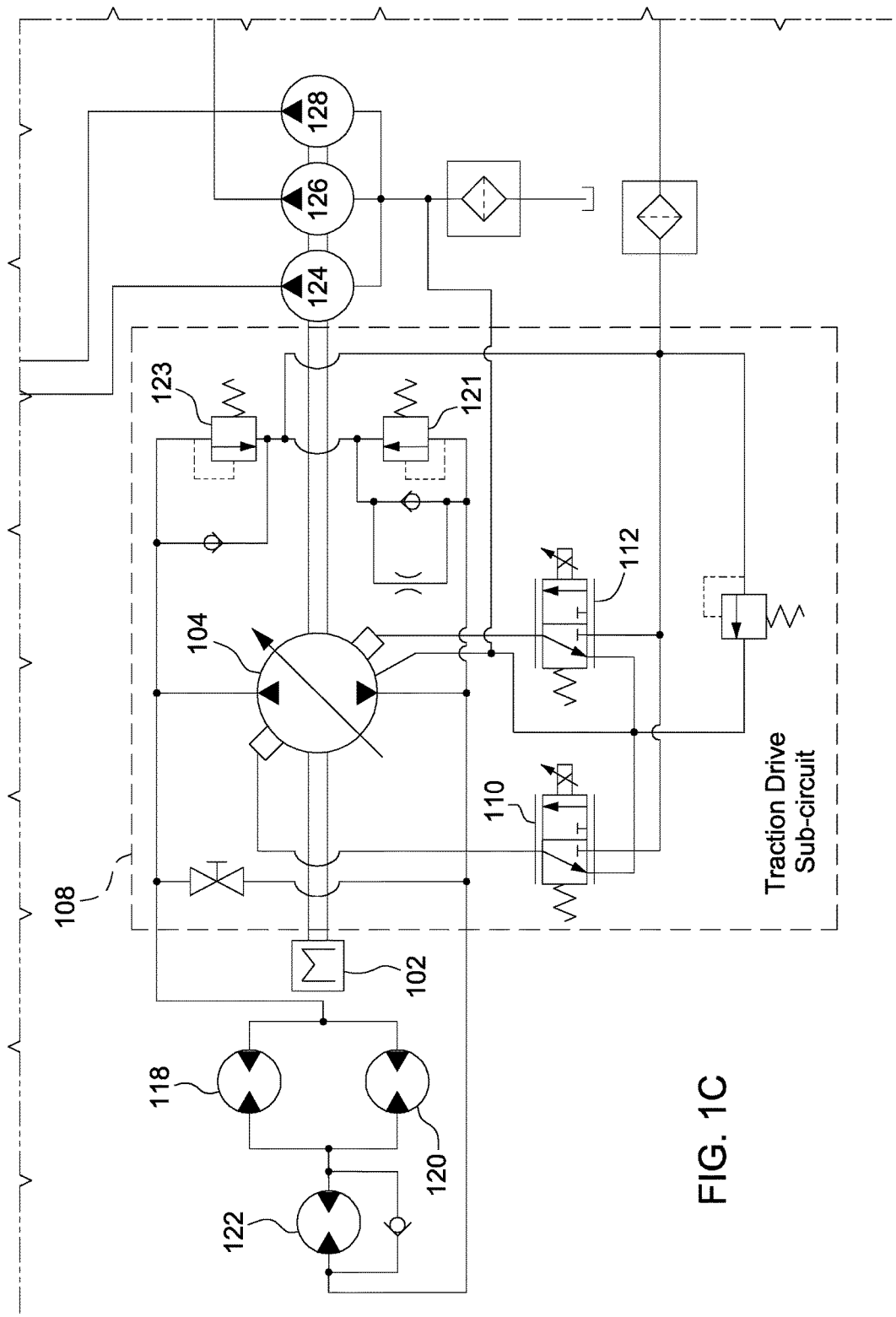
FIG. 1C is a third part of a schematic drawing of a hydraulic circuit having a diverter valve according to a first embodiment of the invention.
Figure 2:
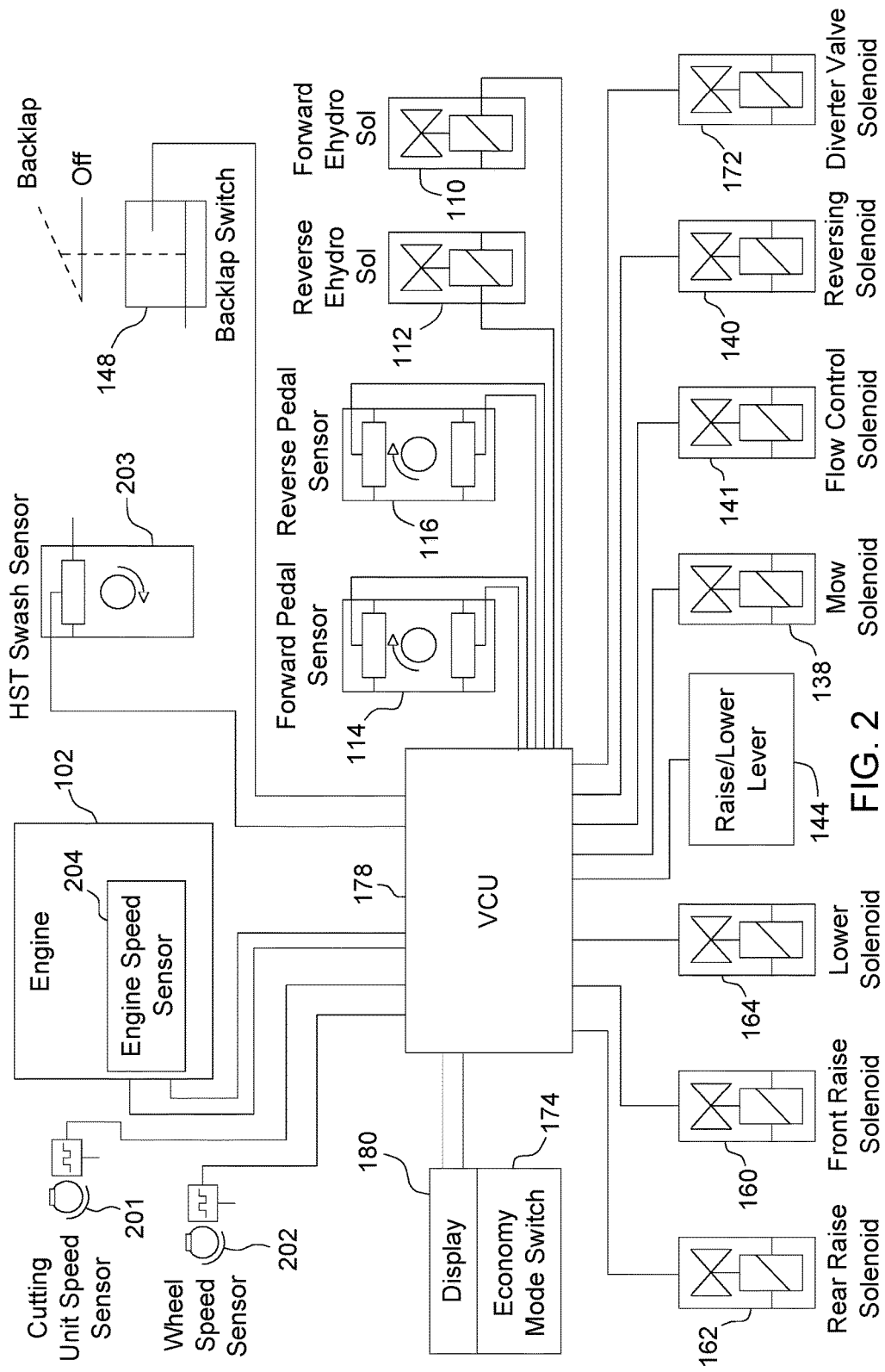
FIG. 2 is a system diagram of a grass mowing machine with a hydraulic circuit having a diverter valve according to a first embodiment of the invention.

In one embodiment, the hydraulic circuit with a diverter valve may include traction drive sub-circuit 108 shown in FIG. 1C. The traction drive sub-circuit may include variable displacement hydraulic pump 104 driven by internal combustion engine 102. A forward pedal and a reverse pedal may be used by the operator to specify a desired traction or ground speed, and forward pedal sensor 114 and reverse pedal sensor 116, shown in FIG. 2, may provide electronic input to the vehicle control unit based on pedal position. The vehicle control unit may actuate forward electrohydraulic solenoid 110 or reverse electrohydraulic solenoid 112 based on input received from the forward pedal sensor or reverse pedal sensor, to provide hydraulic flow to rotate hydraulic traction drive motors 118, 120 and 122 at the desired ground speed in forward or reverse. Relief valves 121, 123 may be included in the traction drive sub-circuit. The vehicle control unit may receive electronic input for actual ground speed from at least one traction wheel speed sensor 202, and from HST swash plate sensor 203, also shown in FIG. 2. The vehicle control unit also may use an electronic throttle control to command the engine to run at a speed necessary to achieve the desired or specified ground speed.

In one embodiment, the hydraulic circuit with a diverter valve may include mowing sub-circuit 130 shown in FIG. 1A. The mowing sub-circuit may provide hydraulic flow from fixed displacement gear pump 124, shown in FIG. 1C and driven by the internal combustion engine, to rotate hydraulic motors 132, 134 and 136 and blades on each of the cutting units. The mowing sub-circuit may include mow solenoid valve 138 that may be used to run the hydraulic cutting unit motors when the cutting units are at the lowered or mowing position, or not run the hydraulic cutting unit motors when the cutting units are in the raised or transport position. The mowing sub-circuit may include reversing solenoid 140, that may be operated using backlap switch 148 shown in FIG. 2 and connected to the electronic vehicle control unit, to rotate the cutting reel motors in a forward direction when mowing, or in a reverse direction for backlapping. The mowing sub-circuit also may include pilot operated relief valve 142, flow control valve 141 and relief valve 143, and cutting unit speed sensor 201 to provide rotational speed of one or more cutting units to the electronic vehicle control unit.

In one embodiment, the hydraulic circuit may include raise/lower sub-circuit 158 shown in FIG. 1B. The raise/lower sub-circuit may be connected to fixed displacement gear pump 128 driven by the internal combustion engine, as shown in FIG. 1C. The raise/lower sub-circuit may extend or retract a plurality of lift cylinders 166, 168, 170 connected to lift arms supporting the cutting units. Restriction orifices 167, 169, 171 may be included in the raise/lower sub-circuit. The raise/lower sub-circuit also may include a plurality of solenoids 160, 162, 164 which may be energized or de-energized by the vehicle control unit when raise-lower lever 144 is used by the operator. These solenoids may operate the lift cylinders, preferably with a time delay between raising or lowering the front cutting units and rear cutting units.

Figure 1D:
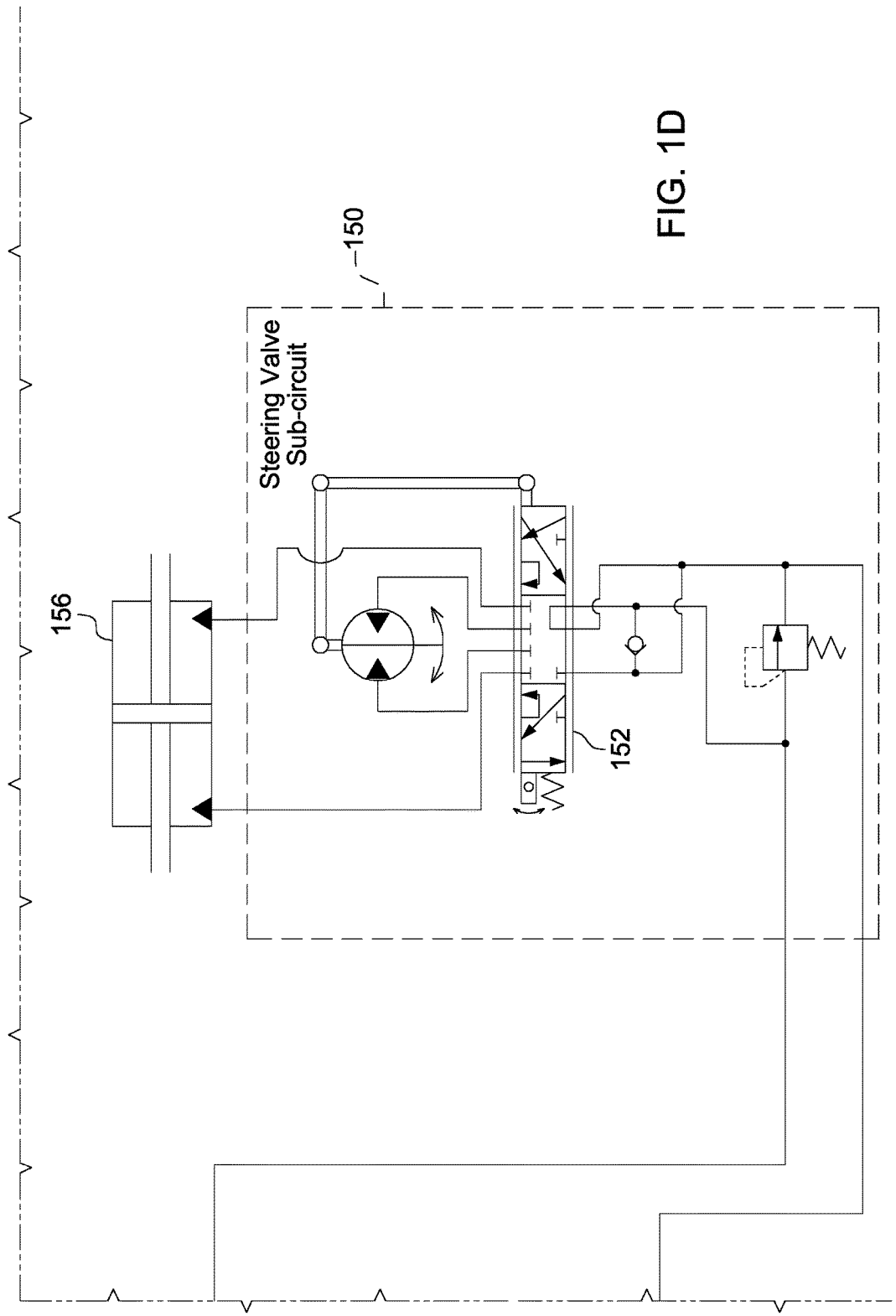
FIG. 1D is a fourth part of a schematic drawing of a hydraulic circuit having a diverter valve according to a first embodiment of the invention.

In one embodiment, the hydraulic circuit also may include steering valve sub-circuit 150 shown in FIG. 1D. The steering sub-circuit may be connected to fixed displacement steering pump 126 shown in FIG. 1C, steering valve 152 and steering cylinder 156. The steering valve sub-circuit may be used to steer one or more wheels of the grass mowing machine based on mechanical or electrical input from a steering wheel or similar steering controls in the operator station of the grass mowing machine.

In one embodiment, the hydraulic circuit may include diverter valve 172 shown in FIG. 1A. The electronic vehicle control unit may actuate the diverter valve to divert hydraulic flow from the raise/lower sub-circuit to the mowing sub-circuit. The diversion of flow may provide sufficient hydraulic flow to allow the mowing sub-circuit to rotate the cutting units at a desired speed while the internal combustion engine runs at a reduced or economy speed. Pressure relief valve 173 also may be provided around diverter valve 172.

In one embodiment, electronic vehicle control unit 178 may actuate diverter valve 172 if the cutting units are at the lowered or mowing position, and the engine is running at the economy mode speed. For example, the electronic vehicle control unit may use a solenoid to actuate the diverter valve. The electronic vehicle control unit may provide a short time delay after engine speed is reduced to the economy speed, and/or after the cutting units are reach the lowered position, before actuating the diverter valve.

In one embodiment, the electronic vehicle control unit may de-actuate the diverter valve when the cutting units are raised above the lowered or mowing position, or if the economy mode switch is used to return the engine to normal speed. For example, if the operator actuates raise/lower lever 144 to raise the cutting units, the vehicle control unit may de-actuate the diverter valve solenoid to resume hydraulic flow to the raise/lower sub-circuit. The operator may actuate the raise/lower lever before and after each pass across a golf course green or other surface. When the cutting units are raised, the vehicle control unit may continue running the engine at the economy mode speed, or may increase engine speed from the economy mode speed back up to the normal speed.

Having described the preferred embodiment, it will become apparent that various modifications can be made without departing from the scope of the invention as defined in the accompanying claims.

The invention claimed is:

1. A grass mowing machine having a plurality of cutting units, comprising:
   an internal combustion engine that runs at a normal engine speed or at an economy mode speed slower than the normal engine speed;
   the engine driving hydraulic pumps connected to a hydraulic circuit having a plurality of sub-circuits including a mowing sub-circuit to rotate the cutting units and a raise/lower sub-circuit to move the cutting units between a raised position and a lowered position;
   a diverter valve diverting hydraulic flow from the raise/lower sub-circuit to the mowing sub-circuit whereby the cutting units continue to rotate at a desired speed when the engine is switched to the economy mode speed and the cutting units are at the lowered position.

2. The grass mowing machine of claim 1, further comprising an electronic vehicle control unit signal connected to the internal combustion engine and to each of the sub-circuits; the electronic vehicle control unit actuating and de-actuating the diverter valve.

3. The grass mowing machine of claim 2, further comprising an operator actuated economy mode switch connected to the electronic vehicle control unit.

4. The grass mowing machine of claim 2, wherein the vehicle control unit delays actuating the diverter valve after the engine is at the economy mode speed and all of the cutting units are at the lowered position.

5. The grass mowing machine of claim 1 wherein the diverter valve is actuated by a solenoid.

6. A grass mowing machine having a plurality of cutting units, comprising:
   a hydraulic circuit having a raise/lower sub-circuit connected to an operator actuated raise/lower lever to move the cutting units between a raised position and a lowered position, and a mowing sub-circuit for rotating a motor on each of the cutting units; and
   an electronic vehicle control unit actuating a diverter valve diverting hydraulic flow from the raise/lower sub-circuit to the mowing sub-circuit so that the cutting unit motors rotate at a desired speed if the electronic vehicle control unit detects a reduction in engine speed and the cutting units in the lowered position.

7. The grass mowing machine of claim 6, wherein the electronic vehicle control unit de-actuates the diverter valve upon actuation of the raise/lower lever to move the cutting units to the raised position.

8. A grass mowing machine having a plurality of cutting units, comprising:

an electronic vehicle control unit signal connected to an internal combustion engine and a raise/lower lever to raise and lower the cutting units; and a diverter valve actuated by the electronic vehicle control unit to increase hydraulic flow to a hydraulic motor on each cutting unit whereby the hydraulic motors continue to operate at a desired speed when the engine speed is reduced to an economy mode speed and the raise/lower lever is in a lowered position.

9. The grass mowing machine of claim 8, wherein actuation of the diverter valve shuts off hydraulic flow to a raise/lower sub-circuit.

10. The grass mowing machine of claim 9, wherein the raise/lower sub-circuit provides hydraulic flow to a plurality of cylinders.

11. The grass mowing machine of claim 8, wherein the diverter valve is solenoid actuated.

* * * * *